UNITED STATES PATENT OFFICE.

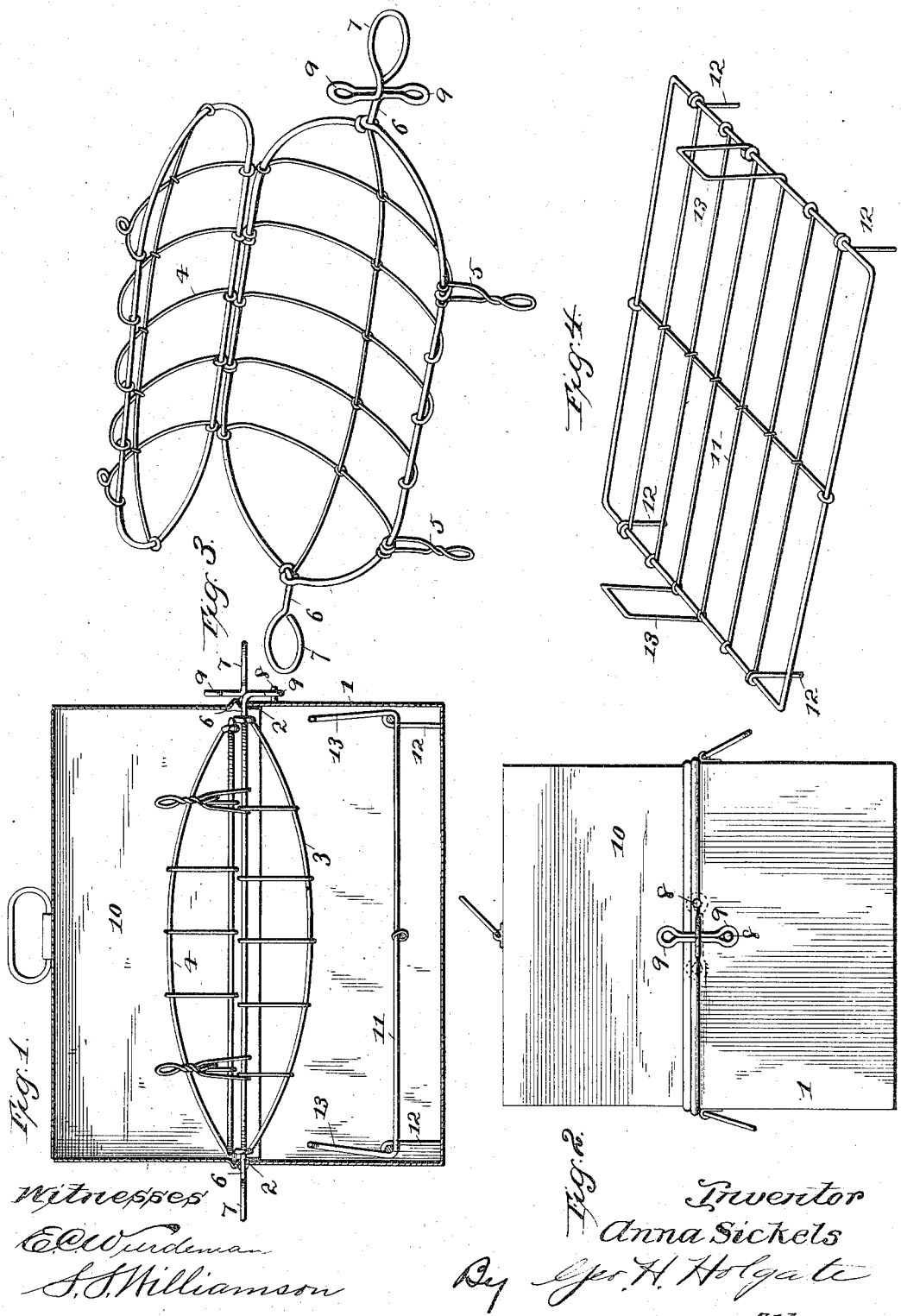

ANNA SICKELS, OF BRISTOL, PENNSYLVANIA.

ROASTING-PAN.

SPECIFICATION forming part of Letters Patent No. 553,363, dated January 21, 1896.

Application filed August 8, 1895. Serial No. 558,663. (No model.)

*To all whom it may concern:*

Be it known that I, ANNA SICKELS, a citizen of the United States, residing at Bristol, in the county of Bucks, State of Pennsylvania, have invented certain new and useful Improvements in Roasting-Pans, of which the following is a specification.

My invention relates to a new and useful improvement in cooking apparatus, and has for its object to provide a device that will render the cooking of meats more simple and improve the action of the heat thereon by enabling the cook to bring all parts of the meat in proper relative position to the heating-surfaces without having to remove such meat from the pan and also to hold said meat in the most desirable shape, so that when cooked and removed from the vessel it will present an appetizing appearance; and with these ends in view it consists in the details of construction and combination of elements hereinafter set forth and then specifically designated by the claim.

In order that those skilled in the art to which this invention appertains may understand how to make and use the same, I will describe its construction and operation in detail, referring by numbers to the accompanying drawings, forming a part of this specification, and in which—

Figure 1 is a vertical longitudinal section of my improved cooking apparatus; Fig. 2, an end elevation of the same, showing the means by which the holder is held in its several positions; Fig. 3, a perspective of said holder in a position ready to receive the meat to be cooked, and Fig. 4 a perspective of the false bottom.

Similar numbers denote like parts in the several views of the drawings.

In roasting meats it is especially advantageous to present all parts thereof to the action of the heating-surfaces equally and to do this without having to disturb the position of the meat upon its rest, as such disturbance is likely to disarrange or break down the shape thereof. Heretofore there has been great difficulty in accomplishing this result, as no means was provided for clamping the meat in its desired shape and then presenting it to the heating-surfaces in different positions; but this I readily accomplish by providing a pan 1 with suitable bearings 2 and journaling therein a holder 3 formed of wires properly crossed and secured and hinging thereto a cover 4, also made of wire, and providing suitable latches 5 by which said cover and the holder are secured in their proper relative positions after the meat has been placed therein. The shape of this holder and cover when in their secured position is such as to hold an ordinary rib-roast or the like in its most desirable shape, so that in cooking it is not necessary to insert wooden pins or tie said roast in shape, but simply to place it in the holder, arrange it in the shape desired and close the cover thereon, latching the same in position, as clearly shown in Fig. 1. When this has been done the holder is placed within the pan, the shank 6 of the handles 7 resting in the bearings 2, by which means the holder may be turned in any desired position. Projecting from one end of the pan are two pins 8, adapted to be engaged by the loops 9 formed upon one of the handles, and by this means the holder is held in one of four positions, as will be readily understood by reference to Fig. 2. Therefore when it is necessary to alter the position of the meat within the pan for the purpose of bringing a different portion thereof in proximity to the hottest surfaces one of the handles 7 is grasped and moved longitudinally so as to disengage the loop from its pin, when the holder is free to turn and the next loop engaged with the proper pin to retain the holder in the desired position.

10 is a top for the pan 1, by which the meat juices are retained within the pan and the process of cooking is that of partially steaming, so that when the meat has been thoroughly cooked it will be impregnated with its own juices and therefore be tender and delicious.

In practice this apparatus has proved very desirable in that but little waste is occasioned by evaporation, and the meat cooked therein is of a superior food quality, as all of the substance thereof is retained without causing a portion of the meat to be sogged, as would be the case if said meat were allowed to rest in the juices.

For the purpose of cooking potatoes and similar articles I provide a false bottom or grating 11 having suitable legs 12 and handles 13, which are adapted to be placed within the pan at the bottom thereof, so as to rest articles thereon when it is not desirable to permit them to so sog in the meat juices, but where it is desired to have said meat juices come in contact with such articles during the process of cooking.

For steaming or roasting oysters or clams the false bottom will be found very useful, and likewise when a moist and delicate toast is to be made.

Having thus described my invention, what I claim as new and useful is—

In a roasting pan, a cage for suspending the meat composed of a frame of heavy wire terminating in handles so bent as to form eyes on either side of one of the handles and smaller wires forming a netting within said frame, a cover hinged to the cage and similarly made having lugs formed thereon, latches formed of loops of wire hinged to the cage and adapted to engage said lugs and hold the cover to the cage, a pan with a close fitting cover, notches formed in the ends of said pan forming bearings for the shanks of the handles and pins disposed about one of said notches to engage the eyes of the handle, as and for the purpose described.

In testimony whereof I have hereunto affixed my signature in the presence of two subscribing witnesses.

ANNA SICKELS.

Witnesses:
S. S. WILLIAMSON,
SAMUEL L. TAYLOR.